Feb. 6, 1923.
J. P. DOVEL
POWER SHOVEL
Filed Jan. 21, 1920
1,444,670
2 sheets-sheet 2
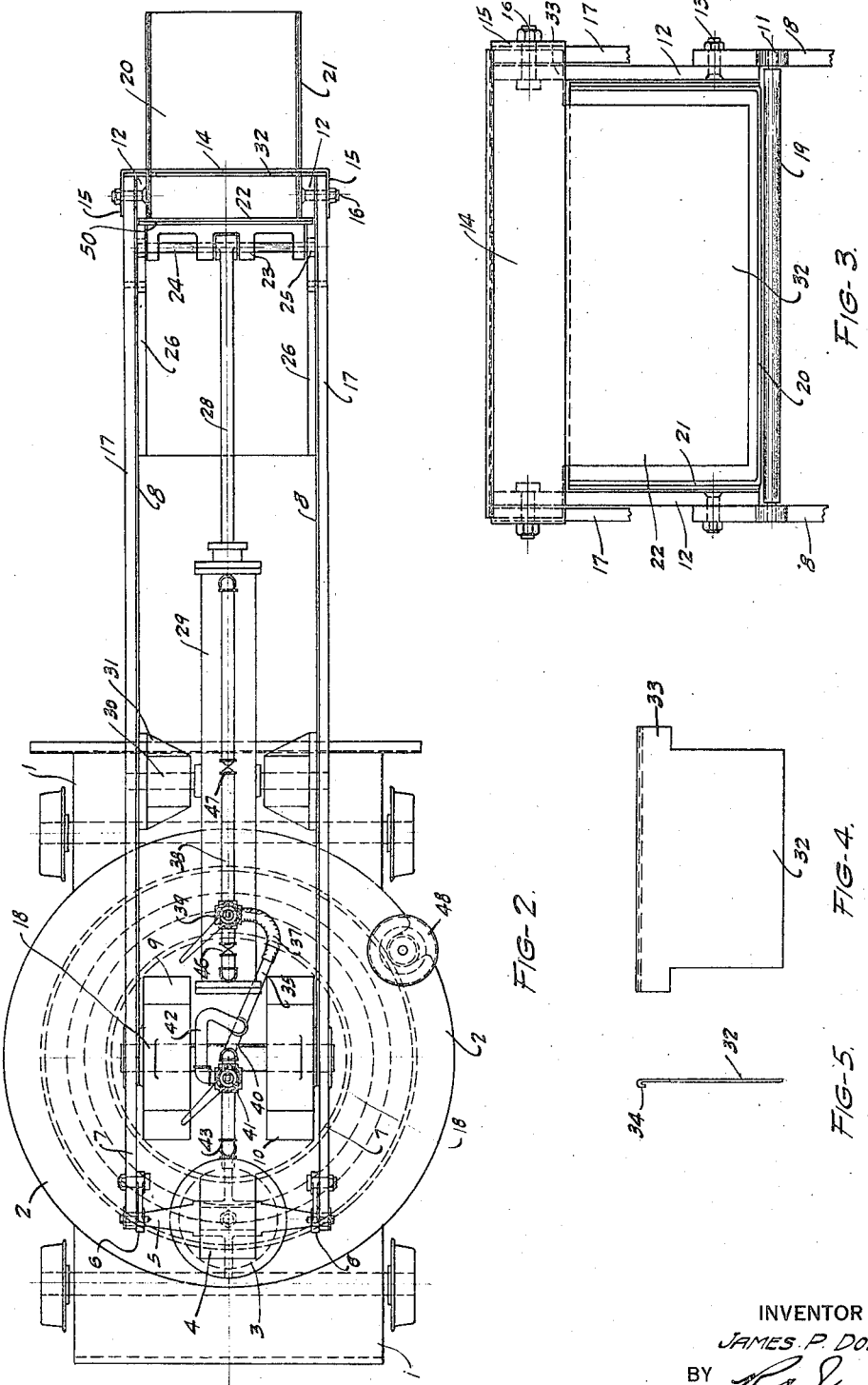
INVENTOR
JAMES. P. DOVEL.
BY
ATTORNEY Patented Feb. 6, 1923.

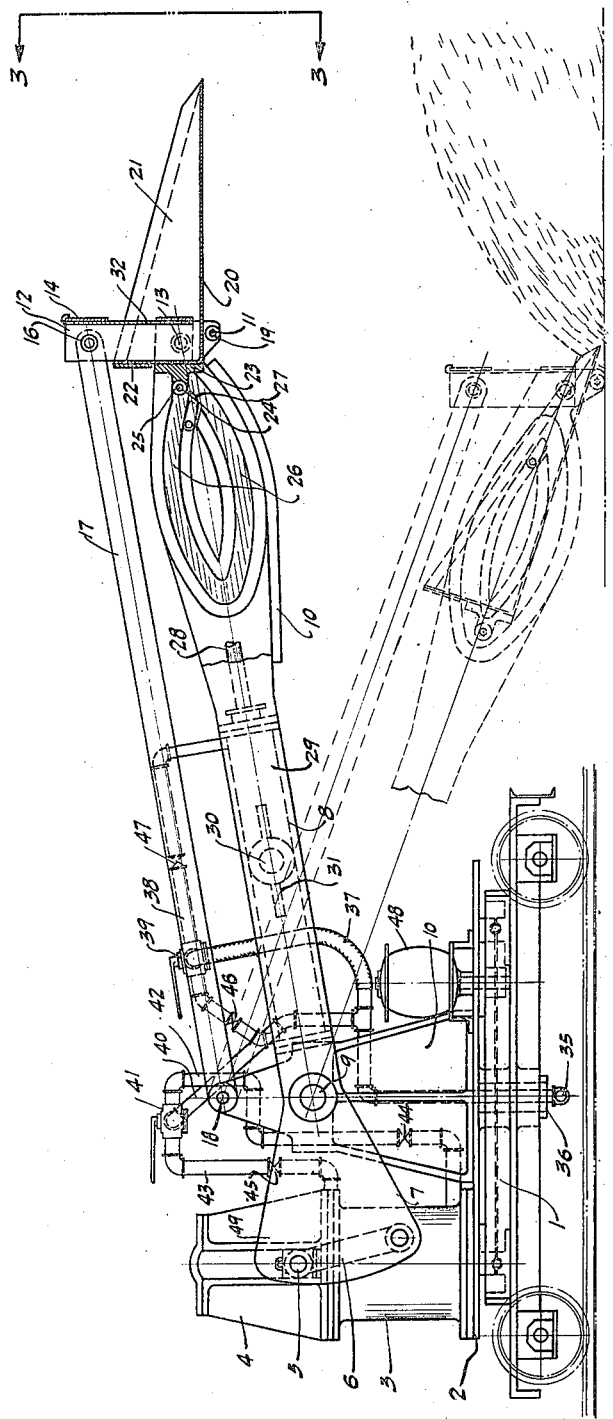

1,444,670

UNITED STATES PATENT OFFICE.

JAMES P. DOVEL, OF BIRMINGHAM, ALABAMA.

POWER SHOVEL.

Application filed January 21, 1920. Serial No. 353,118.

*To all whom it may concern:*

Be it known that I, JAMES P. DOVEL, a citizen of the United States of America, residing at Birmingham, in the county of Jefferson and State of Alabama, have invented certain new and useful Improvements in Power Shovels, of which the following is a specification.

My invention relates to a power shovel or machine adapted for the loading of coal, ore and the like, being especially adapted for use in mines to load the loose mineral from the rooms into mine cars.

My object is to design a machine of the character in question which will be very simple and rugged in its construction and which will operate under skilled control very rapidly and freely with movements quite approaching that of a man in handling a shovel. It is particularly my purpose to so mount and guide the shovel on its swinging supports that it can be easily thrust under the loose material notwithstanding that the floor level may be substantially below the level of the machine.

A further object is to provide a novel means for loading and discharging the shovel, this consisting in reciprocating the shovel on its swinging supports by means of a fluid motor piston, which in conjunction with elliptical guides for the rear end of the shovel, will in a complete reciprocation retract and again thrust forward the shovel, a fixed scraper being provided to make sure that all material will be discharged when the shovel is retracted, in which position it is again presented to the pile of material, after which it is thrust forward with a scooping stroke to take its load. My shovel moves relatively to its supports and guides to load and unload, thereby differing fundamentally from machines which must move bodily forward or thrust the shovel supports forward to load.

A further important object is to operate the swinging boom for the shovel by direct connection to a large fluid power cylinder so that the movement imparted to the boom is direct and quick and the cushioning of the piston will serve to absorb the inertia of the shovel and boom as the latter are brought to a quick stop. The great importance of this is to provide for a very quick and direct manipulation of the shovel which in the hands of a skilled operator will pitch the load from the shovel.

A further object of my invention is to mount the swinging shovel supports and all power machinery for manipulating it upon a turn-table which in turn is mounted upon a truck movable on tracks or otherwise to the desired point of use.

My invention comprises the novel details of construction and arrangements of parts, which in their preferred embodiment only are illustrated in the accompanying drawings, in which:—

Fig. 1 shows the mechanism in side elevation with the shovel shown above the loaded position and below in dotted lines in retracted position ready to take its load.

Fig. 2 is a plan view of Fig. 1.

Fig. 3 is an enlarged front view of the shovel; and

Figs. 4 and 5 are detail front and end views of the scraper blade.

Similar reference numerals refer to similar parts throughout the drawings.

I have illustrated my invention mounted upon a wheel supported truck 1 having thereon a roller bearing turn-table 2 which supports a main power cylinder 3 having mounted overhead guides 4 for the cross head 5 which at each overhung end has swivelled thereon a hanging link 6, each of which in turn is pivotally connected to the rear end 7 of the booms 8 which are journaled on the outer ends of a shaft 9 mounted in spaced bearing brackets 10 on opposite sides of the center of the turntable. These booms 8 are cross connected at their free ends by a bolt 11 and by a frame comprising upright side bars 12 pivotally connected at 13 to the adjacent boom 8 and connected overhead by a metal bar or strap 14 having its ends bent rearwardly at 15 and made fast by pivot bolts 16 which connect the upper ends of the bars 12 to lazy-tong links 17. These links are pivotally connected to vertical bosses 18 on the bearing brackets 10 with their centers in vertical alignment with the axis of the shaft 9. The booms are further cross braced by a plate 10ª and thus form in reality a single structural boom.

By virtue of the connections already described, as the boom is swung vertically on its center 9 the links 17 maintain the bars 12 in true vertical position, this being illustrated clearly in the dotted line showing in Fig. 1. The cross bolt 11 has mounted thereon a roller 19 which serves as an antifriction support upon which the reciprocable shovel 20 rests. The shovel 20 is made of any suitable material reinforced as may be required for the work and provided with sloping side walls 21 and a vertical back wall 22. I attach to the back wall near the bottom thereof a bearing bracket 23 comprising four perforated bearing lugs. A shaft 24 is journaled in said lugs and overhangs at each end, there being mounted on the overhung shaft ends rollers 25 which travel in an oval or elliptical guide track 26, either cast integral with or applied to the inner faces of the booms 8. The inner guide rail of the track comprises a gravitating switch tongue 27 at the forward end of the track which is passed by and drops under the rollers 25 when the bucket has assumed its extreme forward position. The upper track is set at a slight incline upwardly so that the shovel, when lifted upwardly to its normal discharge level, will on retraction travel substantially horizontally. A piston rod 28 is connected to the shaft 24 between the middle bearing lugs and is reciprocable by means of a piston in a cylinder 29 mounted at its center on side trunnions 30 which turn in bearings 31 made fast to the inner edges of the boom 8.

A scraper blade 32, shown in detail in Figs. 4 and 5, is mounted vertically above the shovel and provided with side lugs 33 which are interposed between the cross bar 14 and the side bar 12. The upper edge of the scraper blade is bent over at 34 to overhang the top of the cross bar 14 which thus prevents it dropping down against the shovel though permitting it to be readily removed and a new scraper inserted when needed.

A fluid power from any suitable source is conducted by a pipe 35 through a hollow trunnion 36 for the turn-table 2, and this pipe 35 is connected by a flexible hose 37 with a pipe 38 which under control of a four-way valve 39, supplies fluid pressure to either end of the cylinder 29 and exhausts to the atmosphere fluid pressure from the other end. A pipe 40 conveys fluid pressure overhead to a four-way valve 41 which distributes the pressure to and exhausts it from the main cylinder through pipes 42 and 43. Adjustment valves 44 and 45 are provided in the pipes 42 and 43, respectively, to permit of a regulation of the flow of motor fluid and in like manner adjustment valves 46 and 47 are provided in the pipe 38 on the opposite sides of the valve 39 for the same purpose. A vertically disposed electric or air motor 48 is mounted on the turn-table and provided with a pinion meshing with a rack on the truck for rotating the turn-table.

The main controlling valves 39 and 41 are provided with handles so disposed as to be conveniently manipulated by an operator standing on one side of the platform.

To counterbalance the shovel, the rear ends of the booms 8 are counterweighted at 49.

In operation, the machine is run forward on its truck to the material to be loaded or excavated, the valve 41 is manipulated to drop the shovel to the floor level and the valve 39 manipulated to retract the shovel until its tip stands just in front of the stripping plate and rests on the roller or floor. It will be observed that the shovel in this position is inclined with its rear guide rollers resting on the lower track onto which the weight of the bucket drops them, it being noted that the cylinder will oscillate to permit the rollers to follow the oval guide tracks. The operator then reverses valve 39, and as the shovel is thrust forward its rear end dips causing it to ride forward on its roller support with a scooping action, its tip following closely the floor level until it has taken its load while the rollers on the shaft 24 travel through the lower concave zone of the curved guide 26 and pass above the tongues 27 which drop behind them. The operator thereupon operates valve 41, admitting pressure at the top of the main cylinder 3 and causing the boom to be swung upwardly with a quick rapid movement which is cushioned at its upper end by a quick shift of the valve 41 to trap the fluid pressure below the piston to form a cushion. With the shovel raised in this manner to the desired height, the turn-table if desired is swung to bring the shovel over the dumping position, whereupon the valve 39 is reversed and with a quick movement the shovel is jerked backward with the rollers on the shaft 24 following the upper zone of the guides 26 so that the rear end of the shovel rides over the convex upper track, thereby dipping its tip so that it tends to slip from under the material thereon. Any material tending to stay on the shovel is thrust off by the stripping plate, whereupon the valve 41 is shifted to let the booms drop, the exhaust being again regulated to cushion the down stroke of the boom and bring the shovel to a quick rest, without injury, at the floor level. As the pile of material is worked the motor 48 is operated to swing the shovel horizontally and the car is moved from time to time to follow the work, it being noted that the shovel is free to have vertical play in the guides from its rear pivot connection to the piston 28 as a center, so that it can the more easily follow an irregular floor. It is important to note however that when the shovel has been thrust forward to complete its loading stroke, the ends of the bearing bracket 23 and of a top brace plate 50, which project beyond the sides of the back wall of the bucket, will come into contact with the vertical rear edges of the side bars 12 of the guide frame, and the rear wall of the shovel being at right angles to its bottom, the engagement of these parts with the bar 12 under pressure from the cylinder 29, will force the shovel to assume a horizontal position when fully loaded, and it is held in this position until the pressure is released and reversed in the cylinder 29 to unload the shovel. In this way the lazy-tong control of the guide frame assists in maintaining the horizontal position of the loaded shovel during the upward swing of the boom and presents the bucket in horizontal position at the unloading level.

Though I have referred to my machine more particularly as a loading machine, the novel principles involved are clearly applicable to an excavating machine where the advantages of the quick moving boom carrying a power shovel reciprocable thereon in suitable guides to load and unload itself without requiring a movement of the machine, will be of the greatest importance, as also the use of the fluid motor directly connected to the boom to quickly and positively manipulate it and to bring it to rest quickly with a cushioned stop at its upper or lower level.

I desire to claim these features broadly and without reference to the particular mounting, or to the type of power used, but a fluid power capable of affording a cushioning action is desirable.

Having thus described my invention, what I claim as new and desire to secure by Letters Patent, is:—

1. In a machine of the character described, a movable support, a vertically swinging boom mounted on the support, a shovel, guides on the free end of the boom in which said shovel is mounted free to reciprocate lengthwise of the boom, power means to swing the boom vertically, and a power cylinder on the boom having its piston directly connected to the shovel to reciprocate the shovel on the boom.

2. A vertically swinging boom, means to operate the boom, a shovel stop and stripper at the free end of the boom, means to maintain said stop and stripper vertical throughout the swinging movements of the boom, a shovel, an operating piston hinged to the rear end of the shovel, and guides to permit angular and horizontal play for the shovel, said stop being adapted to engage and hold the shovel horizontal when in engagement therewith.

3. In a loading machine, a vertically adjustable shovel support, a shovel slidably mounted on one end of said support, a power cylinder on said support directly connected to the shovel to reciprocate it lengthwise of said support, and means to strip the shovel as it is retracted.

4. In a machine of the character described, a vertically swinging boom pivoted intermediate its ends and having a shovel mechanism at one end and a fluid power motor having a piston rod and a link driven thereby and directly connected to the other end, in combination with means to guide and reciprocate the shovel on the boom.

5. In a machine of the character described, a vertically swinging boom pivoted intermediate its ends and having a shovel mechanism at one end and a fluid power motor directly connected to the other end, in combination with means to guide and reciprocate the shovel, said boom being counterweighted at the end connected to the motor, as and for the purposes described.

6. A loading machine comprising a shovel, means for maintaining the shovel substantially horizontal throughout its upward swing only, power operated means to swing the shovel vertically and to reciprocate it horizontally and angularly, substantially as described.

7. In a loading machine, a reciprocable shovel, pivoted supporting arms for the shovel connected after the fashion of lazy-tongs to a vertical shovel stop, a support for said arms, power means for oscillating the arms vertically, stop engaging parts on the shovel at right angles to its botttom, and power means to reciprocate the shovel on its supporting arms and hold said parts against said stop.

8. In a machine of the character described, a vertically adjustable boom, a guide and stop frame pivotally mounted on the free end of the boom, a shovel reciprocable in said guide frame, means to support the guide frame in substantially vertical position throughout the vertical swinging travel of the boom, power means to oscillate the boom, and means carried by the boom to reciprocate the shovel and force it against its vertical stop frame, as and for the purposes described.

9. In a machine of the character described, a vertically swinging boom, a shovel guide frame pivoted on the free end of the boom, lazy-tong means to hold the frame substantially vertical throughout the swinging travel of the boom, a fluid pressure motor directly connected to the boom to oscillate it, a fluid pressure motor mounted on the boom, a shovel slidable in said guide frame on the boom and operably connected to said latter motor, and lugs on the shovel adapted to engage the guide frame and hold the shovel horizontal as the boom swings vertically, substantially as described.

10. In a loading machine, a vertically oscillating boom comprising a roller bearing at its free end, a shovel resting on said roller bearing, side guides for the shovel, a power connection to reciprocate the shovel on said bearing lengthwise of said support, guide means to control the angular play of the shovel on the roller, and power means to oscillate the supports, substantially as described.

11. In a loading machine, a base, an oscillating frame pivotally mounted thereon, a vertical fluid pressure cylinder directly connected to the rear end of the frame and having a valve control means to oscillate the frame vertically, a fluid pressure motor mounted lengthwise on the free end of the frame, a shovel slidable on the free end of the frame and reciprocable by the motor thereon, and curved tracks in the frame to guide the reciprocating movement of the shovel.

12. In a machine of the character described, a vertically adjustable boom, a shovel mounted to reciprocate on the free end of the boom, curved guides adapted to give the shovel a scooping stroke on its forward travel on the boom, and means to reciprocate the shovel.

13. In a machine of the character described, a vertically adjustable boom, means to slidably support a shovel at the free end of the boom, means to reciprocate the shovel, and reversely inclined tracks to guide the retracting and forward thrusting movements of the shovel.

14. In a machine of the character described, a vertically swinging boom, a guide frame hinged to the free end of the boom, lazy-tong means to maintain said frame substantially vertical, a shovel reciprocable in said frame, curved tracks to guide the receding and forward thrusting travel of the shovel, a swivelled motor to reciprocate the shovel, and co-acting means in the shovel and frame adapted when pressed together to support the shovel at right angles to said frame.

15. In a machine of the character described, a vertically swinging boom, a shovel guide frame hinged to the free end of the boom, lazy-tong means to maintain said frame substantially vertical, a shovel reciprocable in said frame, stops on the frame to arrest the shovel and hold it horizontal in its extreme forward position, curved tracks to guide the receding and forward thrusting travel of the shovel, and means to cause the shovel to travel always in the same direction about said track, substantially as described.

16. A loading machine comprising a bearing, main boom arms pivoted on each side of the bearing and provided near their free ends with inwardly facing elliptic tracks, cross members connecting said arms and forming a support for a shovel, a shovel reciprocably mounted on said guides and having elements adapted to follow the path of the said elliptical tracks, means to maintain the shovel guides substantially vertical throughout its vertical adjustments, and power means directly connected to vertically oscillate said arms, substantially as described.

17. In a loading machine, a wheel supported base, a turn-table thereon, center bearings on the turn-table, two pairs of arms mounted one above the other on said bearings with their axes in the same vertical plane, a vertical fluid pressure motor on said turn-table directly connected to one pair of arms forming a boom to oscillate them vertically, a shovel support connecting the free ends of all said arms, a shovel horizontally reciprocable in said support, a fluid motor swivelly mounted on said arms and adapted to reciprocate the shovel, a scraper overhanging the shovel and mounted fixedly on said arms relative to the shovel, and guides to direct the movement of the rear end of the shovel while being reciprocated, as and for the purposes described.

In testimony whereof I affix my signature.

JAMES P. DOVEL.

Witness:

NOMIE WELSH.